United States Patent Office 2,907,744
Patented Oct. 6, 1959

2,907,744

ETHERIC ACID ESTERS

Sylvan O. Greenlee, Racine, Wis., assignor to S. C. Johnson & Son, Inc., Racine, Wis.

No Drawing. Application October 3, 1955
Serial No. 538,244

5 Claims. (Cl. 260—47)

This invention relates to new compositions which are etheric acid ester compositions, and more particularly, this invention relates to new compositions which may be prepared by esterifying the carboxyl groups of etheric acids having lower aliphatic and aryl-substituted aliphatic radicals attached through an ether oxygen to the aromatic nucleus of an aryloxy-substituted aliphatic acid.

It is an object of this invention to provide new resinous compositions from aryloxy-substituted aliphatic acids which are valuable in the manufacture of protective coatings, adhesive, molding compositions, etc.

Another object of this invention is to provide new compositions such as described above which display enhanced solubility in such materials as the unsaturated drying oils normally employed in the preparation of protective coatings, adhesives, and related compositions as a plasticizing agent.

Still another object of this invention is to provide new compositions valuable in the manufacture of protective coatings, etc. which possess good chemical resistance as well as such physical characteristics as good flexibility, hardness, gloss, etc.

These and other objects and advantages are attained by the present invention, various novel features of which will become more fully apparent from the following description with particular reference to specific examples which are to be considered as illustrative only.

Currently, resinous materials are widely used in the formulation of protective coatings, molding compositions, adhesives, etc. Compositions such as protective coatings, for example, are frequently prepared by compounding a hard resinous material with a suitable solvent and a plasticizer such as an unsaturated animal, vegetable, or fish oil. The resinous material imparts to the cured coating hardness, gloss, and chemical resistance.

In the preparation of compositions such as these, considerable difficulty is encountered in selecting a combination of plasticizer and resin which is mutually miscible. Those resins which are soluble in plasticizers such as unsaturated vegetable oils are usually not the most desirable from the standpoint of contributing flexibility, toughness, and chemical resistance to the finally cured product.

The etheric resins of this invention have been found to be particularly advantageous as the resin constituent in such compositions as coating and molding compositions as they have been found to be compatible with the unsaturated drying oils normally employed as plasticizers, while imparting to the cured product good gloss, hardness, and chemical resistance. The increased chemical resistance of products derived from these resins is probably accounted for in part by the fact that the ether groups in these resins are inert to normal hydrolysis by water and alkali, common materials to which varnish films are frequently exposed.

In general, the etheric resins of this invention may be prepared by reacting epoxide compositions or polyhydric alcohols with the diether acids derived from hydroxyaryl-substituted aliphatic acids. The epoxide groups and/or the hydroxyl groups of polyhydric alcohols or epoxides react with the carboxyl groups of the diether acids forming ester linkages therewith.

The diether acids employed in this invention may be produced by etherifying the hydroxyl groups of hydroxyaryl-substituted aliphatic acids. Variations in the physical properties of etheric resins prepared from these diether acids may be realized by variation of the type of constituent reacted with the aryl hydroxyl groups of the hydroxyaryl-substituted acids. For instance, if it is desired to form resinous products having good solubility characteristics as well as hardness and chemical resistance, the diether acids may be prepared with alkyl or arlkyl radicals attached through the ether oxygen to the aromatic nucleus of the hydroxyaryl-substituted acid. By preparing ethers having unsaturated alkyl radicals attached to the ether oxygen, drying characteristics may be imparted to resins prepared from these compositions. Similarly, hydroxylated or halogenated radicals may be used to prepare diether acids having slightly modified properties. By substituting alcoholic hydroxyl groups for the phenolic hydroxyl groups of the hydroxyaryl-substituted acid, for example, a diether acid having readily esterifiable hydroxyl groups may be prepared. Resinous products having softening points ranging from room temperature up to about 130–150° C. may be prepared from these diether acids, the softening points depending upon the type of diether acid employed and the method of preparing the resinous product therefrom. A formulator is thus provided with a wide range of starting materials in preparing protective coating, molding, or adhesive products.

The hydroxyaryl-substituted acids valuable in the production of the etheric acids employed in this invention have two hydroxyaryl groups attached to a single carbon atom. The preparation of these substituted acids may be conveniently carried out by condensing a keto-acid with the desired phenol. Experience in the preparation of bisphenols and related compounds indicates that the carbonyl group of the keto-acid should be located next to a terminal carbon atom in order to obtain satisfactory yields. A terminal carbon atom as used herein refers to a primary carbon atom. Prior applications, Serial Nos. 464,607, and 489,300, filed October 25, 1954, and February 18, 1955, respectively, disclose a number of illustrative compounds suitable for use as the hydroxyaryl-substituted acid, and methods of preparing the same. These materials, which are referred to for convenience as Diphenolic Acid, or DPA, may be illustrated by the condensation products of levulinic acid and phenol, substituted phenols, or mixtures thereof.

It is to be understood that the phenolic nuclei of the Diphenolic Acid may be substituted with any groups which will not interfere with the etherification reactions. For example, the nuclei may be alklated with alkyl groups of from 1–5 carbon atoms as disclosed in Serial No. 489,- 300 or they may be halogenated. The Diphenolic Acid derived from levulinic acid and phenol may be advantageous in one instance, since it may be readily prepared to a high degree of purity, whereas the use of substituted phenols, such as the alkylated phenols, usually results in mixed compositions which are less readily purified. On the other hand, there are cases where the Diphenolic Acid derived from alkylated phenols is more desirable than those derived from phenol itself on the basis that the alkyl groups tend to impart better organic solvent solubility, flexibility, and water resistance.

The diether acids employed herein may be prepared by the reaction of these Diphenolic Acid with halides or sulfates of the corresponding alphatic or aryl-substituted aliphatic compositions, carrying out the etherification by reacting alkaline solutions of the Diphenolic Acid with the appropriate halide or sulfate. The preparation and the composition of a typical diether acid may be illustrated by the following equation representing the reaction of 2 mols of vinyl-2-chloroethyl ether with 1 mol of 4,4-bis-(4-hydroxy-3-methylphenyl)-pentanoic acid.

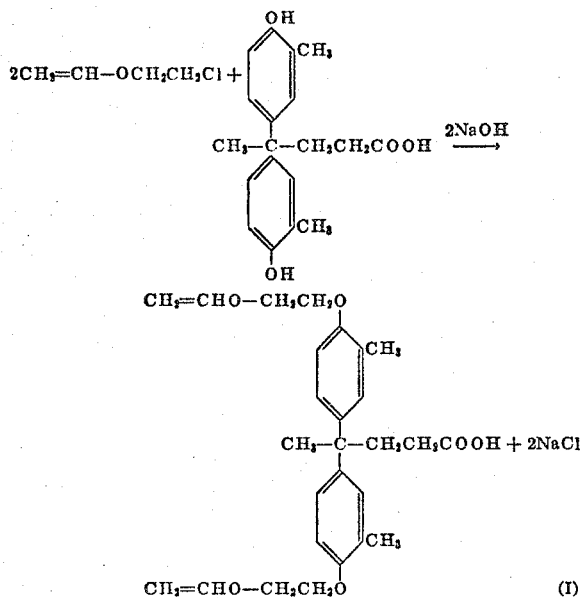

(I)

Illustrative of the lower aliphatic compositions which may be reacted with the Diphenolic Acid are the aliphatic materials having about 10 carbon atoms or less such as the methyl, ethyl and butyl chlorides, ethylhexyl chloride, the monochlorides of methyl, ethyl and propyl ethers, and sulfates, such as dimethyl and diethyl sulfates. Olefin polymerizing or drying characteristics may be imparted to the diethers by using such unsaturated materials as allyl chloride, vinyl-2-chloroethyl ether, 1,3-dichlorobutene-2, methallyl chloride, and 1-chlorobutene-2. A dichloride such as 1,3-dichlorobutene-2, may be used as a monochloride since the 1-chloro group is considerably more chemically active than the 3-chloro group attached to a double bond carbon atom, and may be reacted independently of the 3-chloro group. Mononuclear aryl-substituted lower aliphatic materials such as benzyl chloride or phenyl ethyl chloride can correspondingly be used to impart additional hardness and gloss to resins prepared from the diether acids of this invention. And such materials as ethylene chlorohydrin, glycerol monochlorohydrin, 1-chloro-2-propanol and 1-chloro-3-propanol may be used to prepare hydroxy ether acids which may be further reacted through their hydroxyl groups to form valuable complex products. Each of these materials, as seen from the above, contain a lower aliphatic or aryl-substituted aliphatic radical attached to a single group which is reactive with the phenolic hydroxyl groups to form ether linkages, so that the materials are monofunctional with respect to these phenolic hydroxyl groups. As used herein, the term "lower aliphatic" refers to radicals or constituents wherein the aliphatic portion has about 10 or less carbon atoms.

The diether acids may be prepared by etherification of the phenolic hydroxyl groups of the Diphenolic Acid using the well-known Williamson ether synthesis involving reaction of the metal phenoxide groups, such as sodium phenoxide, with the appropriate halide or sulfate to split out sodium halide or sodium sulfate, respectively. In the preparation of the sodium phenoxides, it is necessary to use enough alkali to neutralize both the carboxyl groups and the phenolic hydroxyl groups of the Diphenolic Acid. It has been found that sodium phenoxide groups are sufficiently more active with the alkyl halides and alkyl sulfates than is the sodium salt of the carboxyl groups so that phenolic ether formation may be carried out without appreciable interference from ester formation. In those instances where an hydroxy ether is formed using such materials as ethylene chlorohydrin, there is no appreciable esterification of the ether hydroxyl groups by the Diphenolic Acid since the salt form of the acid is present in the mixture. The reactions are usually carried out in aqueous solutions since the alkali derivatives of the Diphenolic Acid are ordinarily not appreciably soluble in water-insoluble organic solvents. The reaction temperatures used in carrying out the etherification range from the reflux temperature of the aqueous reaction mixtures (95–100° C.) to 150° C., or even higher temperatures in certain reactions involving relatively inactive halide groups. Reactions carried out, for example, at 150° C. using aqueous alkali solutions require the use of a pressure reaction vessel. The preparation of these diether acids, as well as some illustrative examples, is more fully described in a copending Greenlee application of even date, S. N. 538,243 entitled "Diether Carboxylic Acids."

As examples of the polyhydric alcohols and the epoxide compositions which may be used for esterification with these diether acids are such materials as ethylene glycol, polyethylene glycols, 1,4-butanediol, 2,5-pentanediol, neopentyl glycol, pentaerythritol, sorbitol, polyallyl glycols, triethanolamine, and tetramethylol cyclohexanol. Other materials which may be used include such alcoholic compositions as the reaction products of di- and trihydric phenols with such polyfunctional materials as polyhalohydrins, polyepoxides, or epihalohydrins, to form phenolic polyhydric alcohols having alternating aliphatic chains and aromatic nuclei connected to each other by ether linkages. These compositions may be prepared to contain epoxide groups as well as hydroxyl groups, these epoxide groups also being esterifiable with carboxyl groups to form ester linkages. Preparation of materials such as these as well as illustrative examples are described in U.S. Patents 2,456,408, 2,503,726, 2,615,007, 2,615,008, 2,668,805, and 2,668,807. Well known commercial examples of these resins are the Epon resins marketed by the Shell Chemical Corporation. Illustrative of the formation of these polyhydric materials is the following reaction of a polyhydric phenol and epichlorohydrin, using a molar excess of epichlorohydrin, so that an epoxy alcohol is formed:

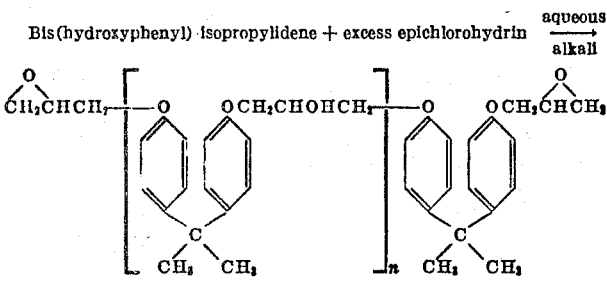

In the above, $n$ indicates the degree of polymerization which has occurred. Other polyhydric materials which may be used in this invention may be illustrated by the reaction products of phenol-formaldehyde condensates with chlorohydrins. For example, an alkyl phenol may be condensed with formaldehyde, followed by treatment of an alkaline solution of the condensation product with a chlorohydrin, such as glycerol monochlorohydrin, to yield a polyhydric alcohol. In general, compositions useful in this invention includes those compositions which are free from functional groups other than epoxide and hydroxyl groups.

Esterification of the carboxyl groups of these diether acids by epoxide or hydroxyl groups is conveniently carried out by directly heating mixtures of the diether acids and alcohols or epoxides at temperatures of about 190-275° C. under conditions where the water produced during esterification is continuously removed as it is formed. In those cases where the esterification involves primarily a reaction between carboxyl groups and epoxide groups, as for example in the partial esterification of Epon type resins, lower temperatures may be used and no water is formed since the reaction of the carboxyl group with the epoxide group is that of direct addition. Since the dietheric acids and the polyhydric alcohols have boiling points which are in most cases above 190° C., any water formed during esterification may be removed by permitting it to volatilize during esterification. Removal of the water may also be facilitated by continuously bubbling through the reaction mixture during esterification a stream of inert gas, such as carbon dioxide or nitrogen. It is also sometimes convenient to facilitate the water removal by carrying out the reaction in a vessel provided with a condenser attached thereto through a water trap, adding a sufficient amount of a volatile, water-insoluble solvent to give reflux at the esterification temperature, and continually removing the water by azeotropic distillation, permitting the solvent to return to the reaction mixture after having dropped the water in the water trap.

Other methods of esterification may be advantageously employed. For instance, esterification of the polyhydric alcohols may be carried out using the acid chlorides or it may be desirable to carry out the esterification using acid interchange of the high molecular weight acids with esters of the polyhydric alcohols and low molecular weight acids, such as the acetates of the polyhydric alcohols.

The following examples will serve to further illustrate this invention; however, it should be understood that the invention is not to be limited thereby. In the examples, porportions are expressed as parts by weight unless otherwise indicated.

Examples I through V, inclusive, illustrate the preparation of diether acids such as may be used in this invention.

*Example I*

To an aqueous alkali solution of 100 parts of NaOH dissolved in 500 parts of water was added 143 parts of 4,4 - bis(4 - hydroxyphenyl)-pentanoic acid. With continuous agitation, 126 parts of dimethyl sulfate was added over a period of 40 minutes holding the temperature at 10-20° C. The reaction mixture was then gradually heated to reflux temperature over a period of 30 minutes and held at this temperature for 2½ hours. At this point, an additional 20 parts of NaOH dissolved in 100 parts of water was added, heating at 100° C. being continued for an additional 2 hours. After the reaction mixture had cooled, sufficient HCl was added to completely neutralize any excess NaOH and to liberate the diether acid. The precipitated diether acid was repeatedly washed by vigorous agitation in hot water until free from inorganic salts. The product was then dried by heating to 130° C. giving a soft, heavy syrup having an acid value of 176. The yield was 86% of the theoretical amount. Acid values as used herein are defined as the number of milligrams of KOH required to neutralize the acidity of a 1-gram sample.

In a similar manner the diethyl ether was prepared from diethyl sulfate to give a product having an acid value of 164.

*Example II*

To an alkaline solution containing 130 parts of NaOH dissolved in 800 parts of water was added 286 parts of 4,4-bis(4-hydroxyphenyl)-pentanoic acid. With continuous agitation, 2 mols of benzyl chloride were added, and the temperature was gradually raised to refluxing temperature over a period of 30 minutes, and held at this temperature for a period of 1 hour and 40 minutes. The reaction was then cooled and acidified with HCl to neutralize any unreacted NaOH and to liberate the diether acid and the product was washed with water to remove the sodium chloride. The product was dehydrated by heating at a temperature of 110° C., to yield a product amounting to 98% of the theoretical yield and having an acid value of 105.

*Example III*

Example II was repeated save that the benzyl chloride was replaced with 2 mols of methallyl chloride, to yield a heavy, syrupy product amount to 86% of the theoretical yield, and having an acid value of 142.

*Example IV*

Example II was repeated save that the benzyl chloride was replaced with 2 mols of vinyl-2-chloroethyl ether, and refluxing was carried on for 44 hours. The product was a hard, brittle solid having an acid value of 117.

*Example V*

Example II was repeated save that the benzel chloride was replaced with 2 mols of n-butyl chloride, and the reaction was carried on in a pressure vessel at a temperature of 150° C. for a period of 1 hour and 45 minutes. A heavy, syrupy product having an acid value of 140 was obtained which amounted to 77% of the theoretical yield.

Examples VI through XIV, inclusive, illustrate the preparation of the etheric acid ester resins of this invention by esterifying typical diether acids.

*Example VI*

A mixture of the diethyl ether acid of Example I and tripentaerythritol was prepared using proportions such that the hydroxyl group content of the mixture was 10% in excess of the carboxyl group content. With continuous agitation, this mixture was heated to 220-250° C. and maintained at this temperature until the acid value of the mixture had decreased to 9.7. Xylene reflux was used to remove water formed during the esterification by azeotropic distillation, collecting the water in a side trap and attaching the reflux condenser to the reaction vessel through the trap. The polyester product had a softening point of 79° C. (Softening points as used herein were determined by the Durrans' Mercury Method.)

*Example VII*

A procedure similar to that of Example VI was used to prepare a polyester from tripentaerythritol and the dimethallyl ether acid of Example III to yield a product having an acid value of 11.3 and a softening point of 114.5° C.

*Example VIII*

A procedure similar to that of Example VI was used to prepare a polyester from tripentaerythritol and the dimethyl ether acid of Example I to yield a product having an acid value of 12 and a softening point of 82° C.

*Example IX*

A procedure similar to that of Example VI was used to prepare a polyester from tripentaerythritol and the dibutyl ether acid of Example V to yield a product having an acid value of 8.8 and a softening point of 62° C.

Example X

A procedure similar to that of Example VI was used to prepare a polyester from tripentaerythritol and the dibenzyl ether acid of Example II to yield a product having an acid value of 8.0 and a softening point of 58° C.

Example XI

A procedure similar to that of Example VI was used to prepare a polyester from tripentaerythritol and the diether acid of Example IV prepared from vinyl-2-chloroethyl ether, to yield a product having an acid value of 4.4 and a softening point of 133° C.

Example XII

A procedure similar to that of Example VI was used to prepare a polyester from glycerol and the dimethyl ether acid of Example I to yield a product having an acid value of 5.8 and a softening point of 60° C.

Example XIII

A procedure similar to that of Example VI was used to prepare a polyester from ethylene glycol and the dibenzyl ether acid of Example II to yield a product having an acid value of 22 and a softening point of 46.° C.

The etheric resins of this invention may be used advantageously in the preparation of coatings, adhesives, molding compositions, etc. as the hard resin constituent of these compositions. In the preparation of varnishes, for instance, they may be used advantageously together with the usual drying oils employed in the production of varnishes, to produce a varnish solution which may be readily cured in thin films to form protective coatings. Generally, the etheric resins were found to mix readily with the drying oil employed in the preparation of the varnish solutions. Examples XV and XIX illustrate the use of etheric resins in typical varnish solutions.

Example XIV

Equal parts of the etheric resin of Example VIII and dehydrated castor oil were heated with continuous agitation at 240–260° C. for 2 hours and 30 minutes. Inert gas was bubbled through the mixture during the entire heating period. The product was dissolved in xylene to a nonvolatile content of 50% and treated with .03% cobalt drier based on the nonvolatile content. This product, when spread in .002" wet films and heated for 30 minutes at 150° C., produced tack-free, flexible films which were unaffected by exposure to boiling water for a period of 3 hours.

Example XV

A mixture of 1 part of the etheric resin of Example XII and 2 parts of dehydrated castor oil was heated as in Example XIV for 1 hour and 10 minutes at 240–260° C., and the product dissolved in xylene to a nonvolatile content of 50%. The xylene solution was treated with .03% cobalt drier based on the nonvolatile content. This product, when spread in .002" wet films and heated for 30 minutes at 150° C., gave tack-free, flexible films which were unaffected by exposure to boiling water for a period of 3 hours.

Example XVI

A mixture of 1 part of the etheric resin of Example X and 2 parts of dehydrated castor oil was similarly heated for 1 hour and 50 minutes at 240–260° C., and the product finally dissolved in xylene to a nonvolatile content of 50%. Wet films of .002" thickness were prepared from a sample of this product containing .03% cobalt drier based on the nonvolatile content. Flexible, tack-free films were obtained on heating these films for 30 minutes at 150° C. which withstood boiling water for a period of 3 hours.

Example XVII

A mixture of 1 part of the etheric resin of Example IX and 2 parts of linseed oil was similarly heated for a period of 1 hour at 240–260° C. and the product finally dissolved in xylene to 50% nonvolatile content. .03% cobalt drier based on the nonvolatile content was added to this xylene solution and wet films of .002" thickness were prepared from this varnish solution. These films, when cured for 1 hour at 150° C., showed no effect on exposure to boiling water for a period of 3 hours.

Example XVIII

A mixture of 1 part of the etheric resin of Example VII and 2 parts of dehydrated castor oil was similarly heated for a period of 40 minutes at 240–260° C. and the product finally dissolved in xylene to 50% nonvolatile content. .03% cobalt drier based on the nonvolatile content was added to this solution and wet films of .002" thickness were prepared from this varnish solution. These films, when cured for 30 minutes at 150° C., were tack-free and flexible, and were unaffected by exposure to boiling water for 3 hours.

It should be understood that while there are disclosed herein but a limited number of embodiments of this invention, it is possible to produce still other embodiments without departing from the inventive concept herein disclosed, and it is intended, therefore, to cover all modifications of the invention which would be apparent to one skilled in the art and that come within the scope of the appended claims.

It is claimed and desired to secure by Letters Patent:

1. A new composition of matter comprising the polyester of (A) a polyhydric alcohol, having a molecular weight of not more than about 8,000 and free from functional groups other than oxirane and hydroxyl groups with (B) a monocarboxylic acid which is a member of the group consisting of aliphatic and aryl-aliphatic diethers of a hydroxyaryl pentanoic acid, the aliphatic portion of said aliphatic and aryl-aliphatic diethers containing not more than about 10 carbon atoms and said hydroxyaryl pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms.

2. The composition of claim 1 where the hydroxyaryl pentanoic acid consists essentially of 4,4 bis(4-hydroxyaryl)-pentanoic acid wherein the hydroxyaryl radical is a hydroxyphenyl radical and is free from substituents other than alkyl groups of 1 carbon atom.

3. The composition of claim 1 wherein the hydroxyaryl pentanoic acid is 4,4 bis(4-hydroxyphenyl)pentanoic acid.

4. The composition of claim 1 wherein said acid (B) is an aliphatic diether of 4,4 bis(4-hydroxyphenyl)pentanoic acid.

5. The composition of claim 1 wherein said acid (B) is an ethylenically unsaturated aliphatic diether of 4,4 bis-(4-hydroxyphenyl)pentanoic acid.

No references cited.

UNITED STATES PATENT OFFICE
CERTIFICATE OF CORRECTION

Patent No. 2,907,744                                       October 6, 1959

Sylvan O. Greenlee

It is hereby certified that error appears in the printed specification of the above numbered patent requiring correction and that the said Letters Patent should read as corrected below.

Column 1, line 25, for "adhesive" read — adhesives —; column 2, line 13, for "arlkyl" read — aralkyl —; line 19, "radi als" read — radicals —; column 4, line 57, for "exces" read — excess —; column 5, line 48, for "porportions" read — proportions —; column 6, line 23, for "amount" read — amounting —; column 7, line 59, for "nonvolat le" read — nonvolatile —.

Signed and sealed this 17th day of May 1960.

(SEAL)
Attest:

KARL H. AXLINE                                              ROBERT C. WATSON
Attesting Officer                                        Commissioner of Patents